US012772921B2

(12) United States Patent
Miller et al.

(10) Patent No.: US 12,772,921 B2
(45) Date of Patent: Oct. 27, 2026

(54) ROW CLEANER PRESCRIPTION METHOD

(71) Applicant: Precision Planting LLC, Tremont, IL (US)

(72) Inventors: Andrew P. Miller, Topeka, IL (US); Matthew Lawson, Tremont, IL (US)

(73) Assignee: Precision Planting, Tremont, IL (US)

( * ) Notice: Subject to any disclaimer, the term of this patent is extended or adjusted under 35 U.S.C. 154(b) by 394 days.

(21) Appl. No.: 18/260,638

(22) PCT Filed: Dec. 17, 2021

(86) PCT No.: PCT/IB2021/061924
§ 371 (c)(1),
(2) Date: Jul. 7, 2023

(87) PCT Pub. No.: WO2022/175741
PCT Pub. Date: Aug. 25, 2022

(65) Prior Publication Data

US 2024/0057507 A1 Feb. 22, 2024

Related U.S. Application Data

(60) Provisional application No. 63/150,428, filed on Feb. 17, 2021.

(51) Int. Cl.
*A01B 79/00* (2006.01)
*A01B 35/16* (2006.01)
*A01B 63/00* (2006.01)
*A01B 79/02* (2006.01)

(52) U.S. Cl.
CPC ............ *A01B 79/005* (2013.01); *A01B 35/16* (2013.01); *A01B 63/008* (2013.01); *A01B 79/02* (2013.01)

(58) Field of Classification Search
CPC ..... A01B 35/16; A01B 63/008; A01B 79/005; A01B 79/02
See application file for complete search history.

(56) References Cited

U.S. PATENT DOCUMENTS

| | | | | |
|---|---|---|---|---|
| 6,389,999 | B1 | 5/2002 | Duello | |
| 8,550,020 | B2 | 10/2013 | Sauder et al. | |
| 9,332,689 | B2 | 5/2016 | Baurer et al. | |
| 10,679,341 | B2 * | 6/2020 | Strnad | G06T 7/001 |
| 10,768,331 | B2 * | 9/2020 | Koch | G01S 13/02 |
| 12,228,075 | B2 | 2/2025 | Brown et al. | |
| 2010/0180695 | A1 | 7/2010 | Sauder et al. | |
| 2013/0104785 | A1 | 5/2013 | Achen et al. | |
| 2014/0007801 | A1 | 1/2014 | Sauder | |
| 2016/0183450 | A2 | 6/2016 | Koch et al. | |
| 2018/0325021 | A1 * | 11/2018 | Connell | A01B 73/044 |
| 2019/0373797 | A1 | 12/2019 | Schoeny et al. | |
| 2020/0029486 | A1 * | 1/2020 | Buehler | A01C 5/066 |
| 2020/0221632 | A1 | 7/2020 | Strnad et al. | |
| 2020/0359559 | A1 | 11/2020 | Koch et al. | |
| 2023/0345854 | A1 | 11/2023 | Stoller | |

FOREIGN PATENT DOCUMENTS

WO 2015065282 A1 10/2014

OTHER PUBLICATIONS

European Patent Office, Search Report for related PCT Application No. PCT/IB2021/061924, dated Apr. 7, 2022, 12 pages.

* cited by examiner

*Primary Examiner* — Matthew R Buck

(57) ABSTRACT

A method of controlling a row cleaner according to a prescription as the row cleaner traverses a field.

8 Claims, 6 Drawing Sheets

ROW CLEANER PRESCRIPTION METHOD

CROSS-REFERENCE TO RELATED APPLICATIONS

This application is a national phase entry under 35 U.S.C. § 371 of International Patent Application PCT/IB2021/061924, filed Dec. 17, 2021 designating the United States of America and published in English as International Patent Publication WO 2022/175741A1 on Aug. 25, 2022, which claims priority to U.S. Application No. 63/150,428, filed 17 Feb. 2021, the contents of which is incorporated herein by reference in its entirety.

BACKGROUND

Agricultural fields can vary by soil type, wetness, elevations, and other factors across an entire field. How one part of a field is treated is not necessarily the same way another part of the field would be treated. It would be helpful to adjust field treatments according to local conditions in a field.

DETAILED DESCRIPTION

All references cited herein are incorporated herein in their entireties. If there is a conflict between a definition herein and in an incorporated reference, the definition herein shall control.

Figure 1:
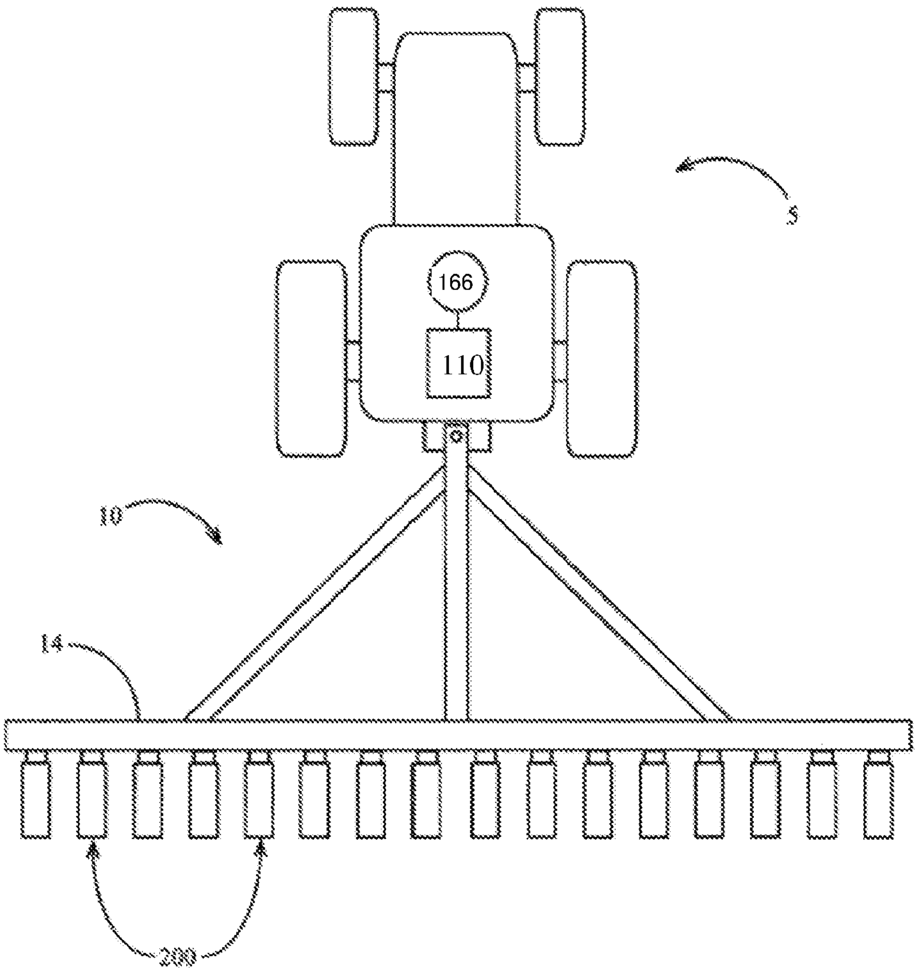
FIG. 1 is a top view of an embodiment agricultural planter.

Referring now to the drawings, wherein like reference numerals designate identical or corresponding parts throughout the several views, FIG. 1 illustrates a tractor 5 drawing an agricultural implement, e.g., a planter 10, comprising a toolbar 14 operatively supporting multiple row units 200. An implement monitor 110 preferably including a central processing unit ("CPU"), memory and graphical user interface ("GUI") (e.g., a touch-screen interface) is preferably located in the cab of the tractor 10. A global positioning system ("GPS") receiver 166 is preferably mounted to the tractor 10. While described using a planter, the invention can be used with any agricultural implement that includes a row cleaner, such as a strip till implement.

Figure 2A:
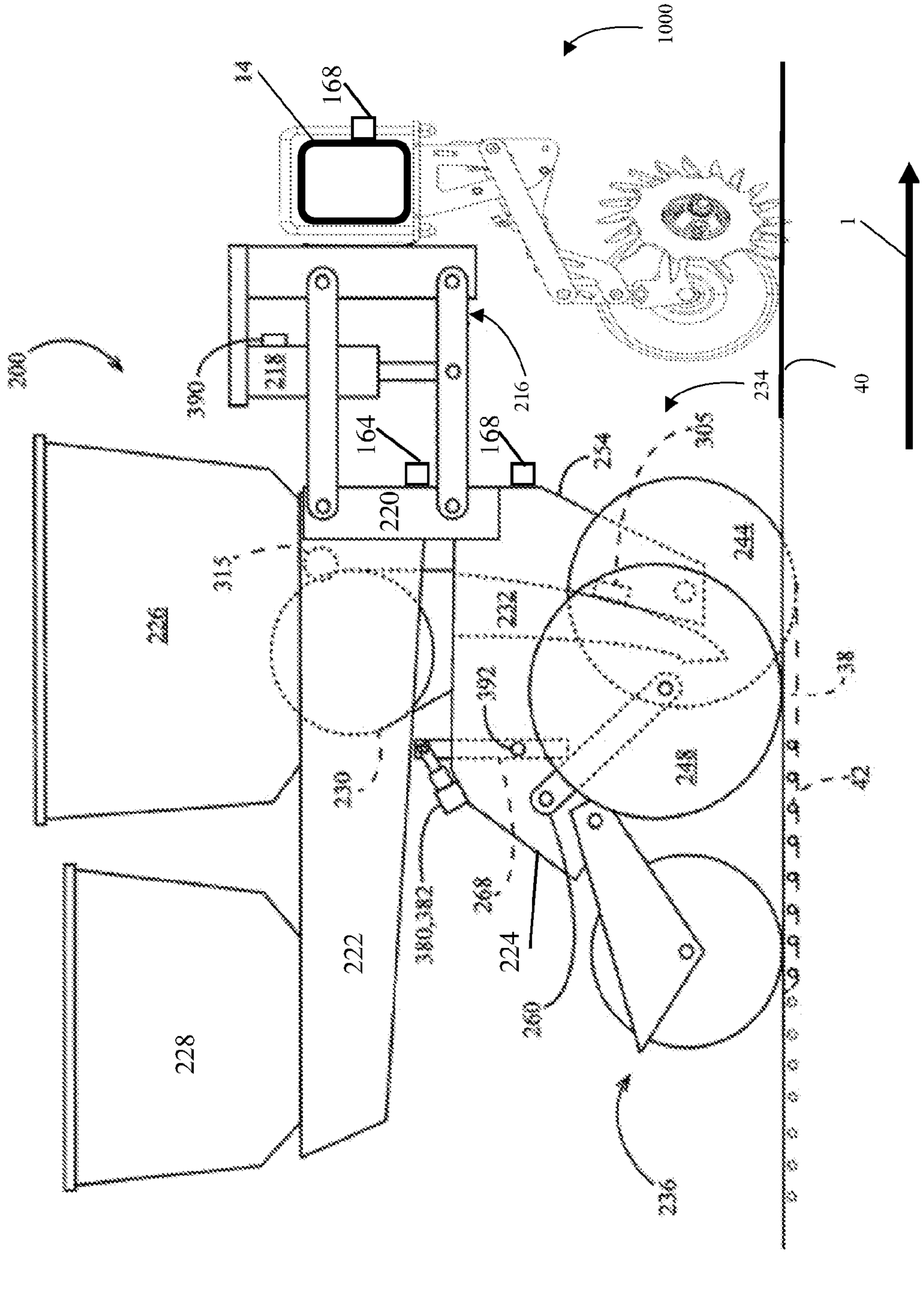
FIG. 2A is a side elevation view of an embodiment of a planter row unit.

Turing to FIG. 2A, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. A solenoid valve 390 is preferably in fluid communication with the actuator 218 for modifying the lift and/or downforce applied by the actuator. An opening system 234 can include two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260; the height of the gauge wheels 248 relative to the opener discs 244 sets the depth of the trench 38. A depth adjustment rocker 268 limits the upward travel of the gauge wheel arms 260 and thus the upward travel of the gauge wheels 248. A depth adjustment actuator 380 is preferably configured to modify a position of the depth adjustment rocker 268 and thus the height of the gauge wheels 248. The actuator 380 is preferably a linear actuator mounted to the row unit 200 and pivotally coupled to an upper end of the rocker 268. In some embodiments the depth adjustment actuator 380 comprises a device such as that disclosed in International Patent Application No. PCT/US2012/035585, the disclosure of which is hereby incorporated herein by reference. An encoder 382 is preferably configured to generate a signal related to the linear extension of the actuator 380; it should be appreciated that the linear extension of the actuator 380 is related to the depth of the trench 38 when the gauge wheel arms 260 are in contact with the rocker 268. A downforce sensor 392 is preferably configured to generate a signal related to the amount of force imposed by the gauge wheels 248 on the soil 40; in some embodiments the downforce sensor 392 comprises an instrumented pin about which the rocker 268 is pivotally coupled to the row unit 200, such as those instrumented pins disclosed in U.S. Patent Application Publication No. US2010/0180695.

Continuing to refer to FIG. 2A, a seed meter 230 such as that disclosed in Applicant's co-pending International Patent Application No. PCT/US2012/030192 is preferably disposed to deposit seeds 42 from a hopper 226 into the trench 38, e.g., through a seed tube 232 disposed to guide the seeds toward the trench. In some embodiments, the meter is powered by an electric drive 315 configured to drive a seed disc within the seed meter. In other embodiments, the drive 315 may comprise a hydraulic drive configured to drive the seed disc. A seed sensor 305 (e.g., an optical or electromagnetic seed sensor configured to generate a signal indicating passage of a seed) is preferably mounted to the seed tube 232 and disposed to send light or electromagnetic waves across the path of seeds 42. A closing system 236 including one or more closing wheels is pivotally coupled to the row unit 200 and configured to close the trench 38.

A row cleaner 1000 can be attached to toolbar 14 or to row unit 200. A nonlimiting example of a row cleaner 1000 is illustrated in FIG. 2A. Examples of a row cleaner are found in U.S. Pat. No. 8,550,020 and U.S. Application Nos. 63/074,684, filed on 4 Sep. 2020, and 63/040,311, filed 17 Jun. 2020.

Figure 3:
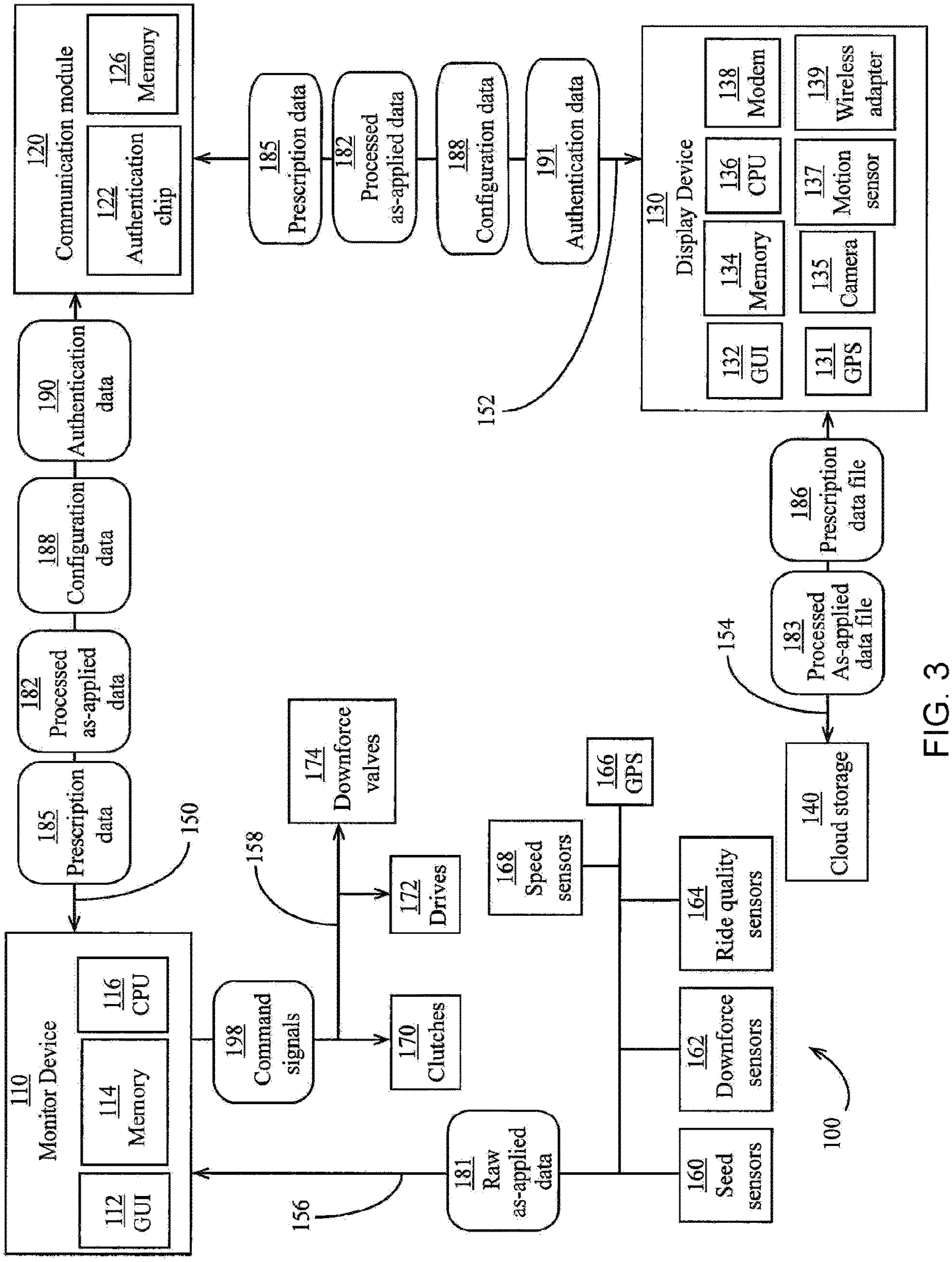
FIG. 3 schematically illustrates an embodiment of a monitor system and data transmission between components of the monitor system.

FIG. 3 illustrates an embodiment of a monitor system 100. An example of a monitor system is described in PCT Publication No. WO2014/026183. The monitor system 100 can include a monitor device 110, a communication module 120, and a display device 130. The monitor device 110 can include a graphical user interface (GUI) 112, memory 114, and a central processing unit (CPU) 116. The monitor device 110 is in electrical communication with the communication module 120 via a harness 150. The communication module 120 optionally, but not necessarily, includes an authentication chip 122 and memory 126. The communication module 120 is in electrical communication with the display device 130 via a harness 152. The display device 130 can include a GUI 132, memory 134, a CPU 136 and a wireless Internet connection means 154 for connecting to a "cloud" based storage server 140. One such wireless Internet connection means 154 may comprise a cellular modem 138. Alternatively, the wireless Internet connection means 154 may comprise a wireless adapter 139 for establishing an Internet connection via a wireless router.

The display device 130 may be a consumer computing device or other multi-function computing device. The display device 130 can include general purpose software including an Internet browser. The display device 130 also can include a motion sensor 137, such as a gyroscope or accelerometer, and can use a signal generated by the motion sensor 137 to determine a desired modification of the GUI 132. The display device 130 also can include a digital camera 135 whereby pictures taken with the camera 135 may be associated with a global positioning system (GPS) position, stored in the memory 134 and transferred to the cloud storage server 140. The display device 130 also can include a GPS receiver 131.

The monitor device 110 is preferably in electrical communication with seed sensors 305, downforce sensors 392, ride quality sensors 164, a GPS receiver 166, and one or more speed sensors 168 via a harness 156. The monitor device 110 is preferably in electrical communication with clutches 170, drives 172, and downforce valves 390 via a harness 158.

Figure 2B:
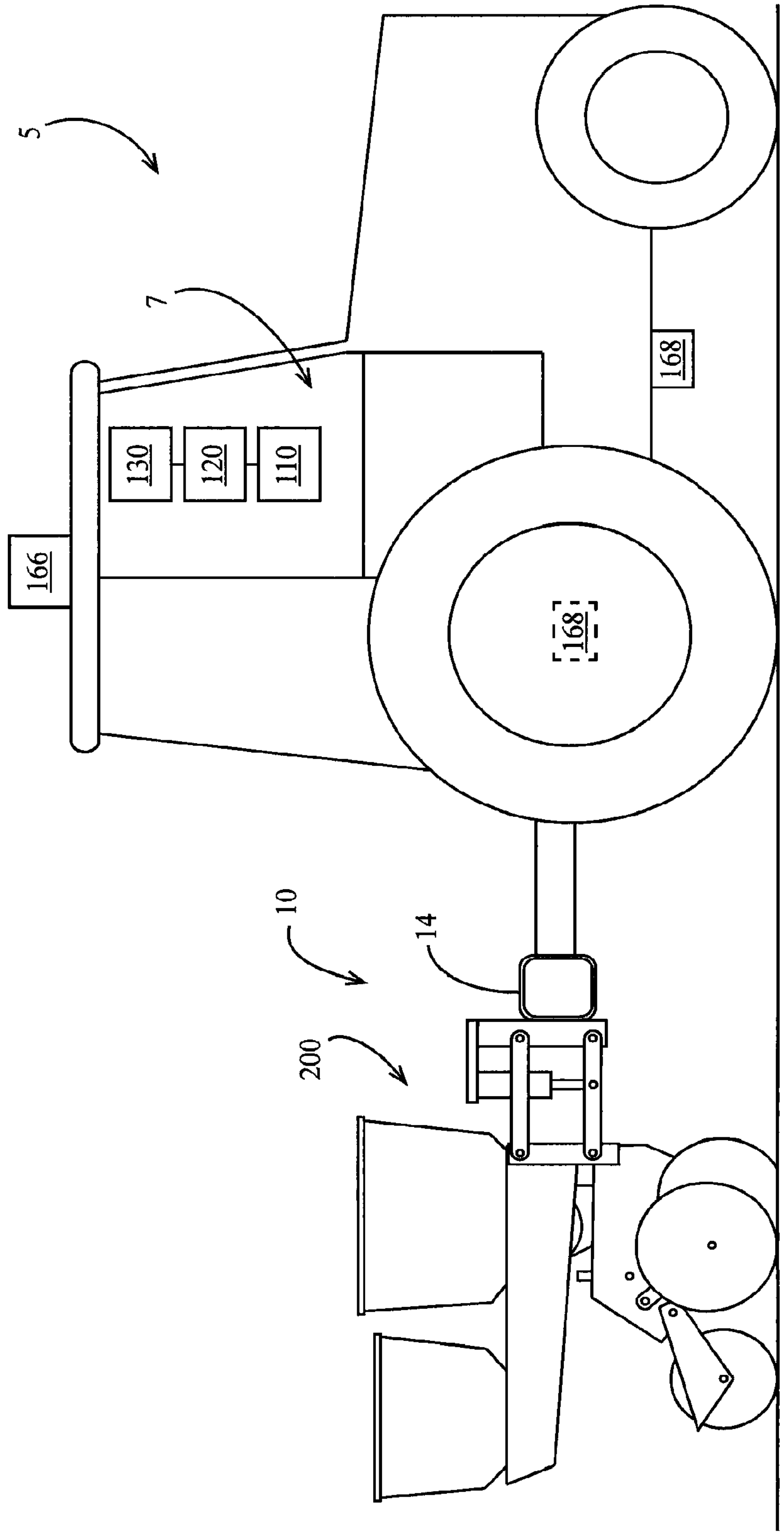
FIG. 2B is a side elevation view of a tractor and planter with the row unit of FIG. 2A and other components of the monitor system of FIG. 3.

Turning to FIGS. 2A and 2B, an embodiment of the monitor system 100 is illustrated integrated on a planter 10 drawn by a tractor 5. The planter 10 includes a transversely extending toolbar 14 to which multiple row units 200 are mounted.

Referring to FIG. 2A, each row unit 200 is supported from the toolbar 14 by a parallel linkage 216 which permits each row unit to move vertically independently of the toolbar and the other spaced row units in order to accommodate changes in terrain or upon the row unit encountering a rock or other obstruction as the planter is drawn through the field. The ride quality sensor 164, preferably an accelerometer, is mounted to the row unit 200 and disposed to measure the vertical velocity and acceleration of the row unit 200. Speed sensors 168, such as radar speed sensors or GPS speed sensors, are preferably mounted to the toolbar 14 or to the row unit 200. A downforce actuator 218, such as an air bag, hydraulic or pneumatic cylinder or the like, acts on the parallel linkage 16 to exert a downforce on the row unit. The downforce valve 390, such as an electrically operated servo valve, controls the amount of downforce applied by the downforce actuator 218. Each row unit 200 further includes a front mounting bracket 220 to which is mounted a hopper support beam 222 and a subframe 224. The hopper support beam 222 supports a seed hopper 226 and a fertilizer hopper 228 as well as operably supporting a seed meter 230 and a seed tube 232. The subframe 224 operably supports a furrow opening assembly 234 and a furrow closing assembly 236.

In operation of the planter 10, the furrow opening assembly 234 of the row unit 200 cuts a furrow 38 into the soil surface 40 as the planter 10 is drawn through the field. The seed hopper 226, which holds the seeds to be planted, communicates a constant supply of seeds 42 to the seed meter 230. In some embodiments the planter 10 is a central-fill planter including a frame-mounted bulk hopper as is known in the art; in such embodiments the seed hopper 226 preferably comprises a small auxiliary hopper in seed communication with the bulk hopper. The seed meter 230 of each row unit 200 is preferably selectively engaged to the drive 172 via the clutch 170 such that individual seeds 42 are metered and discharged into the seed tube 232 at regularly spaced intervals based on the seed population desired and the speed at which the planter is drawn through the field. The drive 172 and clutch 170 may be of the types disclosed in Applicant's U.S. patent application Ser. No. 12/228,075 incorporated herein in its entirety by reference. In other embodiments, the clutch 170 is omitted and the drives 172 comprise electric drives such as those disclosed in Applicant's International Patent Application No. PCT/US2013/051971, incorporated herein in its entirety by reference. The seed sensor 305, preferably an optical sensor, is supported by the seed tube 232 and disposed to detect the presence of seeds 42 as they pass. The seed 42 drops from the end of the seed tube 232 into the furrow 38 and the seeds 42 are covered with soil by the closing wheel assembly 236.

The furrow opening assembly 234 can include a pair of furrow opening disk blades 244 and a pair of gauge wheels 248 selectively vertically adjustable relative to the disk blades 244 by a depth adjusting mechanism 268. The depth adjusting mechanism 268 preferably pivots about the downforce sensor 392, which preferably comprises a pin instrumented with strain gauges for measuring the force exerted on the gauge wheels 248 by the soil 40. The downforce sensor 392 is preferably of the type disclosed in Applicant's U.S. patent application Ser. No. 12/522,253, incorporated herein in its entirety by reference. In other embodiments, the downforce sensor is of the types disclosed in U.S. Pat. No. 6,389,999, incorporated herein in its entirety by reference. The disk blades 244 are rotatably supported on a shank 254 depending from the subframe 224. Gauge wheel arms 260 pivotally support the gauge wheels 248 from the subframe 224. The gauge wheels 248 are rotatably mounted to the forwardly extending gauge wheel arms 260.

Referring to FIG. 2B, the GPS receiver 166 is preferably mounted to an upper portion of the tractor 5. The display device 130, communication module 120, and monitor device 110 are mounted in a cab 7 of the tractor 5. One or more speed sensors 168, such as a hall-effect wheel speed sensor or a radar speed sensor, are preferably mounted to the tractor 5.

Control module 112 cooperates with a Global Positioning System (GPS) 166 and is configured to access a desired row cleaner downforce prescription map for setting and/or modifying the desired row cleaner downforce as the planter traverses the field. The row cleaner downforce prescription map may be based upon soil types, elevations, or location-specific preferences set by the operator prior to operation. In such an embodiment, the control module 112 may be used to specify a different desired row cleaner downforce to each row unit or groups of row units to more accurately follow the row cleaner downforce prescription map. For example, if the locations of the far right row unit and the far left row unit on the planter correspond to different prescribed desired row cleaner downforces based on soil type or other predefined factor, the control module 12 is preferably capable of setting the appropriate desired row cleaner downforce for each of the row units.

Monitor System Operation

Figure 4:
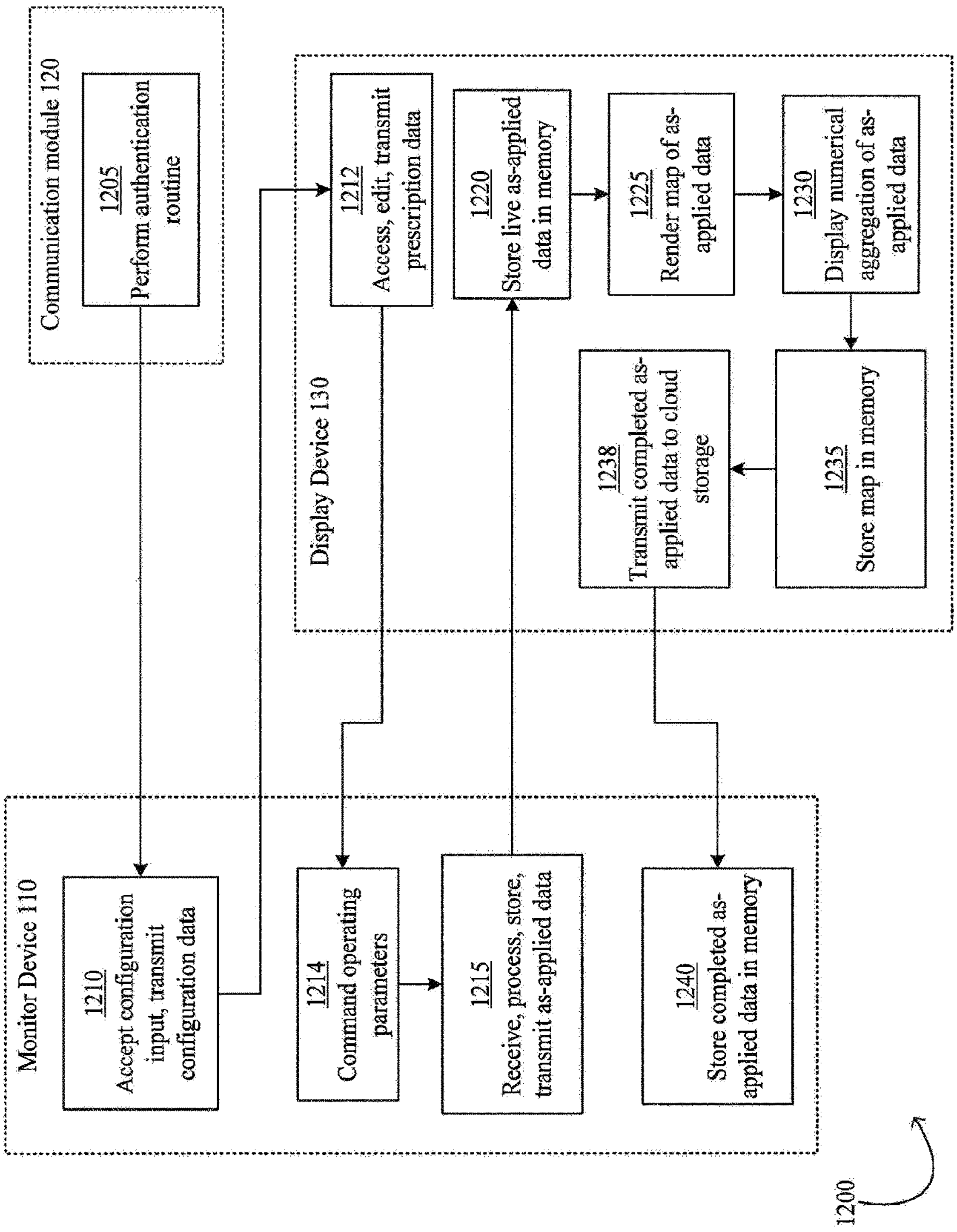
FIG. 4 illustrates an embodiment of a process for setting up a monitor system, controlling an implement, and storing and mapping operational data.

In operation, the monitor system 100 of FIG. 3 preferably carries out a process designated generally by reference numeral 1200 in FIG. 4. Referring to FIG. 4 in combination with FIG. 3, at step 1205, the communication module 120 optionally performs an authentication routine in which the communication module 120 receives a first set of authentication data 190 from the monitor device 110 and the authentication chip 122 compares the authentication data 190 to a key, token or code stored in the memory 126 of the communication module 120 or which is transmitted from the display device 130. If the authentication data 190 is correct, the communication module 120 preferably transmits a second set of authentication data 191 to the display device 130 such that the display device 130 permits transfer of other data between the monitor device 110 and the display device 130 via the communication module 120 as indicated in FIG. 3.

At step 1210, the monitor device 110 accepts configuration input entered by the user via the GUI 112. In some embodiments, the GUI 112 may be omitted and configuration input may be entered by the user via the GUI 132 of the display device 130. The configuration input comprises parameters preferably including dimensional offsets between the GPS receiver 166 and the row cleaners 1000. The monitor device 110 can then transmit the resulting configuration data 188 to the display device 130 via the communication module 120 as indicated in FIG. 3.

At step 1212, the display device 130 can access prescription data file 186 from the cloud storage server 140 or any other stored source. The prescription data file 186 can include a file (e.g., a polygon data file) containing geographic boundaries (e.g., a field boundary) and relating geographic locations (e.g., GPS coordinates) to operating parameters (e.g., row cleaner downforce). The display device 130 preferably allows the user to edit the prescription data file 186 using the GUI 132. The display device 130 preferably reconfigures the prescription data file 186 for use by the monitor device 110 and transmits resulting prescription data 185 to the monitor via the communication module 120.

At step 1214, as the planter 10 is drawn through the field, the monitor device 110 sends command signals 198 to the row cleaners 1000.

At step 1215, as the planter 10 is drawn through the field, the monitor device 110 can receive raw as-applied data 181. The monitor device 110 preferably processes the raw as-applied data 181, and stores the as-applied data to the memory 114. The monitor 130 preferably transmits processed as-applied data 182 to the display device 130 via the communication module 120. The processed as-applied data 182 is preferably streaming, piecewise, or partial data.

It should be appreciated that according to the method 1200, implement control and data storage are performed by the monitor device 110 such that if the display device 130 stops functioning, is removed from the monitor system 100, or is used for other functions, the implement operations and essential data storage are not interrupted.

At step 1220, the display device 130 receives and stores the live processed as-applied data 182 in the memory 134. At step 1225, the display device 130 preferably renders a map of the processed as-applied data 182 (e.g., a row cleaner downforce map) as described more fully elsewhere herein. The map can include a set of application map images superimposed on an aerial image. At step 1230, the display device 130 preferably displays a numerical aggregation of as-applied data. At step 1235, the display device 130 preferably stores the location, size and other display characteristics of the application map images rendered at step 1225 in the memory 134. At step 1238, after completing planting operations, the display device 130 preferably transmits processed as-applied data file 183 to the cloud storage server 140. Processed as-applied data file 183 is preferably a complete file (e.g., a data file). At step 1240 the monitor device 110 preferably stores completed as-applied data (e.g., in a data file) in the memory 114.

Figure 5:
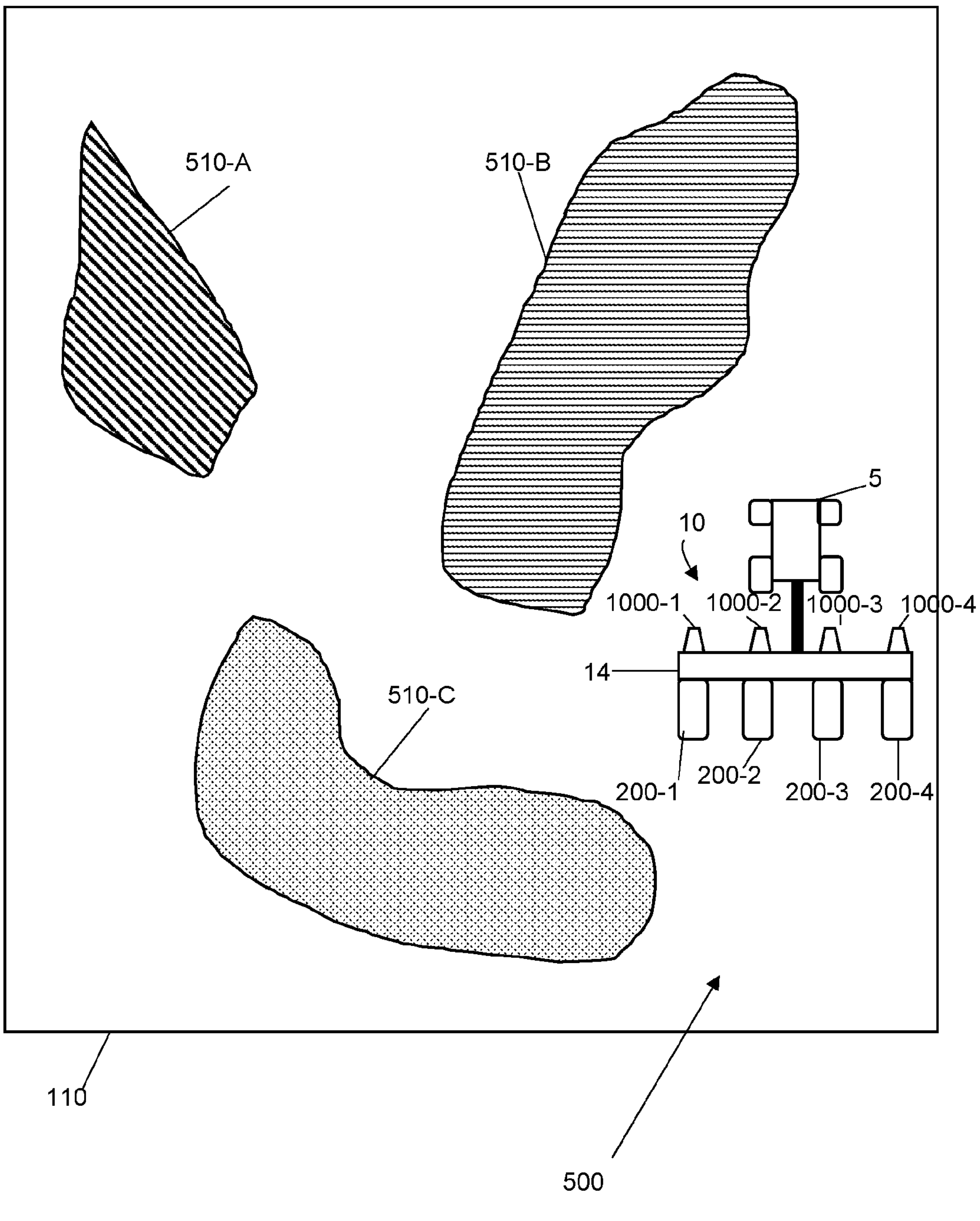
FIG. 5 illustrates a monitor displaying a prescription map.

FIG. 5 illustrates monitor 110 displaying a prescription map 500. There are one or more zones 510 (510-A, 510-B, and 510-C) on prescription map 100 that each require a different amount of row cleaner applied force. FIG. 5 illustrates a four row unit planter 10, but the number or row units can be any number. As planter 10 drawn by tractor 5 passes over zone 510, the force applied to row cleaner 1000 (1000-1, 1000-2, 1000-3, 1000-4) is adjusted based on the prescription for that zone 510.

EXAMPLES

The following are non-limiting examples.

Example 1—a method comprising: loading a row cleaner prescription map into a monitor, wherein the monitor is associated with controlling a row cleaner on an agricultural implement; traversing the agricultural implement across a field; and adjusting a force applied to the row cleaner according to the prescription map as the agricultural implement traverses the field.

Example 2—the method of Example 1, wherein there are a plurality of row units and each row unit is adjusted independent from other row units.

Example 3—the method of Example 1, wherein there are a plurality of row units, and the row units are grouped into sections, and each section is adjusted independent from other sections.

Example 4—the method of any preceding Example further comprising measuring and recording an applied force for each row unit at a location in the field.

Example 5—the method of any preceding Example, wherein the agricultural implement is a planter.

Example 6—the method of any preceding Example, wherein the agricultural implement is a strip till implement.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method comprising:

a. loading a row cleaner prescription map into a memory of a monitor, wherein the monitor is associated with controlling a row cleaner on an agricultural implement, wherein the row cleaner prescription map comprises geo-referenced prescription data that relates global positioning system (GPS) coordinates to commanded row cleaner force values;

b. traversing the agricultural implement across a field; and c. automatically adjusting a force applied to the row cleaner in response to determining a current GPS position of the agricultural implement and determining commanded row cleaner force values from the row cleaner prescription map for the current GPS position of the agricultural implement as the agricultural implement traverses the field.

2. The method of claim 1, wherein there are a plurality of row cleaners, and each row cleaner is adjusted independent from other row cleaners.

3. The method of claim 1, wherein there are a plurality of row cleaners, and the row cleaners are grouped into sections, and each section is adjusted independent from other sections.

4. The method of claim 2 further comprising measuring and recording an applied force for each row cleaner at a location in the field.

5. The method of claim 1, wherein the agricultural implement is a planter.

6. The method of claim 1, wherein the agricultural implement is a strip till implement.

7. The method of claim 1, wherein traversing the agricultural implement across the field for an agricultural operation occurs after loading the row cleaner prescription map into the memory of the monitor of a cab of a tractor that is towing the agricultural implement.

8. The method of claim 1, wherein the row cleaner prescription map comprises geo-referenced prescription data that relates geo-referenced zones in the field to commanded row cleaner force values including a first geo-referenced zone having a first commanded row cleaner force value and a second geo-referenced zone having a second commanded row cleaner force value.

* * * * *